(12) United States Patent
Jin et al.

(10) Patent No.: US 11,352,293 B2
(45) Date of Patent: Jun. 7, 2022

(54) REVERSE ION EXCHANGE PROCESS FOR LITHIUM CONTAINING GLASS

(71) Applicant: CORNING INCORPORATED, Corning, NY (US)

(72) Inventors: Yuhui Jin, Painted Post, NY (US); Pascale Oram, Hammondsport, NY (US); Rostislav Vatchev Roussev, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 262 days.

(21) Appl. No.: 16/425,290

(22) Filed: May 29, 2019

(65) Prior Publication Data

US 2019/0367410 A1    Dec. 5, 2019

Related U.S. Application Data

(60) Provisional application No. 62/678,569, filed on May 31, 2018.

(51) Int. Cl.
*C03C 21/00*    (2006.01)
*C03C 3/085*    (2006.01)
*C03C 3/097*    (2006.01)

(52) U.S. Cl.
CPC ............ *C03C 21/002* (2013.01); *C03C 3/085* (2013.01); *C03C 3/097* (2013.01)

(58) Field of Classification Search
None
See application file for complete search history.

(56) References Cited

U.S. PATENT DOCUMENTS

2013/0133745 A1*  5/2013  Hamilton ............. C03C 21/001
                                                      136/260
2021/0080778 A1*  3/2021  Hatano ................... C03C 15/00

FOREIGN PATENT DOCUMENTS

WO        2013130653 A2      9/2013
WO    WO-2014192097 A1 *   12/2014  ............ C03C 17/30
WO        2018143991 A1      8/2018
WO        2019079400 A1      4/2019

OTHER PUBLICATIONS

Invitation to Pay Additional Fees and Partial Search Report of the European International Searching Authority; PCT/US2019/034322; dated Sep. 26, 2019; 12 Pgs.

* cited by examiner

*Primary Examiner* — Lisa L Herring
(74) *Attorney, Agent, or Firm* — Kevin M. Johnson

(57) ABSTRACT

A method of reworking lithium containing ion exchanged glass-based articles is provided. The method includes a reverse ion exchange process that returns the glass-based article to approximately the composition of the glass from which the glass-based article was produced, before being subjected to ion exchange.

15 Claims, 8 Drawing Sheets

REVERSE ION EXCHANGE PROCESS FOR LITHIUM CONTAINING GLASS

CROSS-REFERENCE TO RELATED APPLICATIONS

This application claims the benefit of priority under 35 U.S.C. § 119 of U.S. Provisional Application Ser. No. 62/678,569 filed on May 31, 2018, the content of which is relied upon and incorporated herein by reference in its entirety.

BACKGROUND

The disclosure relates to a process for reversing the ion exchange of a lithium containing glass-based article.

Glass-based articles are widely used in electronic devices as cover plates or windows for portable or mobile electronic communication and entertainment devices, such as cellular phones, smart phones, tablets, video players, information terminal (IT) devices, laptop computers and the like, as well as in other applications. As glass-based articles become more widely used, it has become more important to develop strengthened glass-based articles having improved survivability, especially when subjected to tensile stresses and/or relatively deep flaws caused by contact with hard and/or sharp surfaces.

The chemical strengthening process may produce glass-based articles with surface defects, such as scratches, or undesired stress profiles. For economic reasons, it is desirable to rework glass-based articles with such defects to increase the yield of strengthened glass-based articles with the desired characteristics. However, removing material from the surface of strengthened glass-based articles necessitates the re-ion exchange of the material to achieve the desired surface compressive stress characteristics, which can produce undesired dimensional changes or warping of the glass-based article. Additionally, the re-ion exchange step may produce undesired internal diffusion of the ions introduced during the chemical strengthening procedure and relaxation of the stress in the glass-based article. Thus, there is a need for a process to increase the yield of chemically strengthened articles by enabling the rework of chemically strengthened glass-based articles with a non-desired stress profile or surface defects such that the resulting glass-based articles exhibit a desired stress profile and surface compressive stress.

SUMMARY

According to aspect (1), a method is provided. The method comprises: reverse ion exchanging an ion exchanged glass-based article in a reverse ion exchange medium to produce a reverse ion exchanged glass-based article. The reverse ion exchange medium comprises a lithium salt and a non-ion exchangeable multivalent metal salt.

According to aspect (2), the method of aspect (1) is provided, wherein the lithium salt is lithium nitrate.

According to aspect (3), the method of aspect (1) or (2) is provided, wherein the non-ion exchangeable multivalent metal salt comprises at least one of a nitrate, sulfate, and a chloride.

According to aspect (4), the method of any of the preceding aspects is provided, wherein the non-ion exchangeable multivalent metal salt comprises at least one of calcium nitrate, magnesium nitrate, and strontium nitrate.

According to aspect (5), the method of any of the preceding aspects is provided, wherein the reverse ion exchange medium comprises the non-ion exchangeable multivalent metal salt in an amount of greater than or equal to 5 wt %.

According to aspect (6), the method of any of the preceding aspects is provided, wherein the reverse ion exchange medium comprises the non-ion exchangeable multivalent metal salt in an amount of greater than or equal to 50 wt %.

According to aspect (7), the method of any of the preceding aspects is provided, wherein the reverse ion exchange medium comprises the non-ion exchangeable multivalent metal salt in an amount of less than or equal to 80 wt %.

According to aspect (8), the method of any of the preceding aspects is provided, wherein the reverse ion exchange medium further comprises a sodium salt.

According to aspect (9), the method of aspect (8) is provided, wherein the ratio of the lithium salt to the sodium salt in the reverse ion exchange medium is within 10% of the ratio of the lithium oxide to sodium oxide content at the center of the ion exchanged glass-based article.

According to aspect (10), the method of any of the preceding aspects is provided, wherein the reverse ion exchange medium is at a temperature of greater than or equal to 340° C. to less than or equal to 520° C.

According to aspect (11), the method of any of the preceding aspects is provided, wherein the reverse ion exchange medium comprises less than or equal to 1 wt % potassium nitrate.

According to aspect (12), the method of any of the preceding aspects is provided, wherein the reverse ion exchange medium is substantially free of potassium nitrate.

According to aspect (13), the method of any of the preceding aspects is provided, wherein the reverse ion exchange in the reverse ion exchange medium extends for a period of greater than or equal to 1 hours to less than or equal to 48 hours.

According to aspect (14), the method of any of the preceding aspects is provided, wherein the reverse ion exchanged glass-based article comprises $K_2O$ in an amount within 1 mol % of the composition at the center of the reverse ion exchanged glass-based article after the reverse ion exchange in the reverse ion exchange medium.

According to aspect (15), a method is provided. The method comprises: reverse ion exchanging an ion exchanged glass-based article in a first reverse ion exchange medium; and reverse ion exchanging the ion exchanged glass-based article in a second reverse ion exchange medium to produce a reverse ion exchanged glass-based article. The first reverse ion exchange medium comprises a sodium salt, and the second reverse ion exchange medium comprises a sodium salt and a lithium salt.

According to aspect (16), the method of aspect (15) is provided, wherein the second reverse ion exchange medium further comprises a non-ion exchangeable multivalent metal salt.

According to aspect (17), the method of aspect (16) is provided, wherein the non-ion exchangeable multivalent metal salt comprises at least one of a nitrate, sulfate, and a chloride.

According to aspect (18), the method of aspect (16) or (17) is provided, wherein the non-ion exchangeable multivalent metal salt comprises at least one of calcium nitrate, magnesium nitrate, and strontium nitrate.

According to aspect (19), the method of any of aspects (16) to (18) is provided, wherein the second reverse ion exchange medium comprises the non-ion exchangeable multivalent metal salt in an amount of greater than or equal to 5 wt %.

According to aspect (20), the method of any of aspects (15) to (19) is provided, wherein the sodium salt in the first reverse ion exchange medium is sodium nitrate.

According to aspect (21), the method of any of aspects (15) to (20) is provided, wherein the lithium salt in the second reverse ion exchange medium is lithium nitrate.

According to aspect (22), the method of any of aspects (15) to (21) is provided, wherein the sodium salt in the second reverse ion exchange medium is sodium nitrate.

According to aspect (23), the method of any of aspects (15) to (22) is provided, wherein the first reverse ion exchange medium is at a temperature of greater than or equal to 400° C. to less than or equal to 420° C.

According to aspect (24), the method of any of aspects (15) to (23) is provided, wherein the reverse ion exchange in the first reverse ion exchange medium extends for a period of greater than or equal to 5 minutes to less than or equal to 24 hours.

According to aspect (25), the method of any of aspects (15) to (24) is provided, wherein the reverse ion exchange in the first reverse ion exchange medium extends for a period less than half of the total ion exchange time in the first and second reverse ion exchange mediums.

According to aspect (26), the method of any of aspects (15) to (25) is provided, wherein the reverse ion exchange in the second ion exchange medium is at a temperature of greater than or equal to 380° C. to less than or equal to 400° C.

According to aspect (27), the method of any of aspects (15) to (26) is provided, wherein the reverse ion exchange in the second reverse ion exchange medium extends for a period greater than or equal to half of the total ion exchange time in the first and second reverse ion exchange mediums.

According to aspect (28), the method of any of aspects (15) to (27) is provided, wherein the ion exchanged glass-based article comprises $K_2O$ in an amount within 4 mol % of the composition at the center of the ion exchanged glass-based article after the reverse ion exchange in the first reverse ion exchange medium.

According to aspect (29), the method of any of aspects (15) to (28) is provided, wherein the reverse ion exchanged glass-based article comprises $K_2O$ in an amount within 1 mol % of the composition at the center of the reverse ion exchanged glass-based article after the reverse ion exchange in the second reverse ion exchange medium.

According to aspect (30), the method of any of aspects (15) to (29) is provided, wherein the first reverse ion exchange medium further comprises potassium.

According to aspect (31), the method of any of aspects (15) to (30) is provided, wherein the first reverse ion exchange medium further comprises $KNO_3$ in an amount greater than or equal to 6 wt %.

According to aspect (32), the method of any of aspects (15) to (31) is provided, wherein the first reverse ion exchange medium has a Na/Li ratio greater than a Na/Li ratio of the second reverse ion exchange medium.

According to aspect (33), the method of any of the preceding aspects is provided, further comprising removing between 1 µm and 10 µm from the surface of the reverse ion exchanged glass-based article.

According to aspect (34), the method of any of the preceding aspects is provided, further comprising re-ion exchanging the reverse ion exchanged glass-based article in a re-ion exchange medium to form a re-ion exchanged glass-based article.

According to aspect (35), the method of aspect (34) is provided, wherein the re-ion exchange medium comprises: greater than or equal to 15 wt % to less than or equal to 40 wt % $NaNO_3$; and greater than or equal to 60 wt % to less than or equal to 85 wt % $KNO_3$.

According to aspect (36), the method of aspect (34) or (35) is provided, wherein the re-ion exchange in the re-ion exchange medium extends for a period of greater than or equal to 30 minutes to less than or equal to 120 minutes.

According to aspect (37), the method of any of aspects (34) to (36) is provided, wherein the re-ion exchange medium is at a temperature of greater than or equal to 350° C. to less than or equal to 420° C.

According to aspect (38), the method of any of aspects (34) to (37) is provided, further comprising re-ion exchanging the re-ion exchanged glass-based article in a second re-ion exchange medium.

According to aspect (39), the method of aspect (38) is provided, wherein the second re-ion exchange medium comprises: greater than or equal to 3 wt % to less than or equal to 15 wt % $NaNO_3$; and greater than or equal to 85 wt % to less than or equal to 97 wt % $KNO_3$.

According to aspect (40), the method of aspect (38) or (39) is provided, wherein the second re-ion exchange medium is at a temperature of greater than or equal to 350° C. to less than or equal to 420° C.

According to aspect (41), the method of any of aspects (38) to (40) is provided, wherein the re-ion exchange in the second re-ion exchange medium extends for a period of greater than or equal to 10 minutes to less than or equal to 30 minutes.

According to aspect (42), the method of any of the preceding aspects is provided, further comprising ion exchanging a glass-based article in an ion exchange medium to form the ion exchanged glass-based article.

According to aspect (43), the method of aspect (42) is provided, wherein the ion exchange medium comprises: greater than or equal to 15 wt % to less than or equal to 40 wt % $NaNO_3$; and greater than or equal to 60 wt % to less than or equal to 85 wt % $KNO_3$.

According to aspect (44), the method of aspect (42) or (43) is provided, wherein the ion exchange in the ion exchange medium extends for a period of greater than or equal to 30 minutes to less than or equal to 120 minutes.

According to aspect (45), the method of any of aspects (42) to (44) is provided, wherein the ion exchange medium is at a temperature of greater than or equal to 350° C. to less than or equal to 420° C.

According to aspect (46), the method of any of aspects (42) to (45) is provided, further comprising ion exchanging the ion exchanged glass-based article in a second ion exchange medium.

According to aspect (47), the method of aspect (46) is provided, wherein the second ion exchange medium comprises: greater than or equal to 3 wt % to less than or equal to 15 wt % $NaNO_3$; and greater than or equal to 85 wt % to less than or equal to 97 wt % $KNO_3$.

According to aspect (48), the method of aspect (46) or (47) is provided, wherein the second ion exchange medium is at a temperature of greater than or equal to 350° C. to less than or equal to 420° C.

According to aspect (49), the method of any of aspects (46) to (48) is provided, wherein the ion exchange in the second ion exchange medium extends for a period of greater than or equal to 10 minutes to less than or equal to 30 minutes.

According to aspect (50), the method of any of the preceding aspects is provided, wherein the ion exchanged glass-based article comprises lithium.

According to aspect (51), a reverse ion exchanged glass-based article produced by any of the preceding aspects is provided.

These and other aspects, advantages, and salient features will become apparent from the following detailed description, the accompanying drawings, and the appended claims.

DETAILED DESCRIPTION

Figure 1:
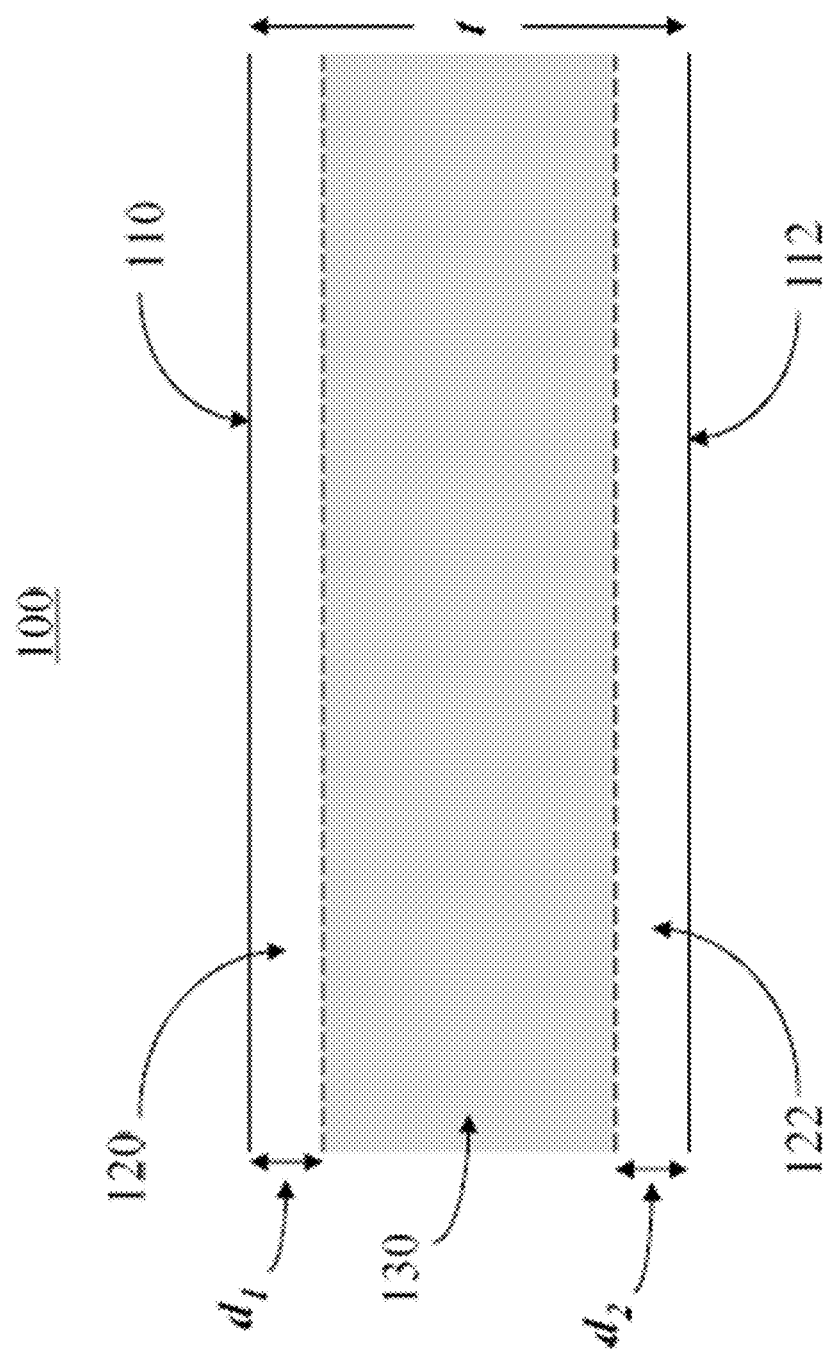
FIG. 1 is a schematic cross-sectional view of a strengthened alkali aluminosilicate glass-based article according to one or more embodiments.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass-based article" is used in its broadest sense to include any object made wholly or partly of glass, including glass ceramics. Unless otherwise specified, all compositions described herein are expressed in terms of mole percent (mol %), and the constituents are provided on an oxide basis.

Unless otherwise specified, all temperatures are expressed in terms of degrees Celsius (° C.). As utilized herein, the term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a glass that is "substantially free of $K_2O$" is one in which $K_2O$ is not actively added or batched into the glass, but may be present in very small amounts as a contaminant. It is intended that when a value is disclosed herein utilizing the modifier "about," the exact value is also disclosed.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Maximum tensile stress or central tension (CT) values are measured using a scattered light polariscope (SCALP) technique known in the art.

As used herein, depth of compression (DOC) means the depth at which the stress in the chemically strengthened alkali aluminosilicate glass-based article described herein changes from compressive to tensile. DOC may be measured by FSM or a scattered light polariscope (SCALP) depending on the ion exchange treatment. Where the stress in the glass-based article is generated by exchanging potassium ions into the glass-based article, FSM is used to measure DOC. Where the stress is generated by exchanging sodium ions into the glass-based article, SCALP is used to measure DOC. Where the stress in the glass-based article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass-based articles is measured by FSM.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are methods for reverse ion exchanging glass-based articles. For example, the reverse ion exchange methods may be employed as part of a process for reworking chemically strengthened glass-based articles which exhibit a manufacturing defect. The defects may include surface defects or undesired stress profiles. Surface defects may be the result of handling during the manufacturing process, and may include scratches, dents, and dimples. An undesired stress profile may result from ion exchange conditions that are outside of specifications.

Surface defects may be removed from a chemically strengthened glass-based article by removing material from the surface, such as by polishing or etching. The removal of material from the surface of the glass-based article also removes a portion of the glass-based article that is under compressive stress. Thus, the glass-based article must be subjected to an additional ion exchange to achieve the desired stress profile after removing material from the surface. The additional ion exchange may negatively impact the strength and dimensional stability of the glass-based article. For example, the additional ion exchange may produce internal diffusion and stress relaxation in the glass-based article, as well as result in part growth that renders the glass-based article outside of desired dimensional tolerances.

The methods described herein include a reverse ion exchange step that serves to return the chemically strengthened glass-based articles to approximately the composition of the glass-based article prior to the chemical strengthening ion exchange. In embodiments, the reverse ion exchange step employs a reverse ion exchange medium comprising a lithium salt and a non-ion exchangeable multivalent metal salt. In some embodiments, the reverse ion exchange step may employ a two-step process, where the first reverse ion exchange medium includes a sodium salt and the second reverse ion exchange medium includes a sodium salt and a lithium salt. After the reverse ion exchange the glass-based article may be optionally processed to remove material from the surface before re-ion exchanging the glass-based article to produce a desired stress profile. The reworked glass-based articles may contain a buried high index peak that corresponds to a $K_2O$ concentration profile having a portion wherein the $K_2O$ concentration increases to a local $K_2O$ concentration maximum, allowing the reworked glass-based articles to be distinguished from a non-reworked glass-based article.

Figure 2:
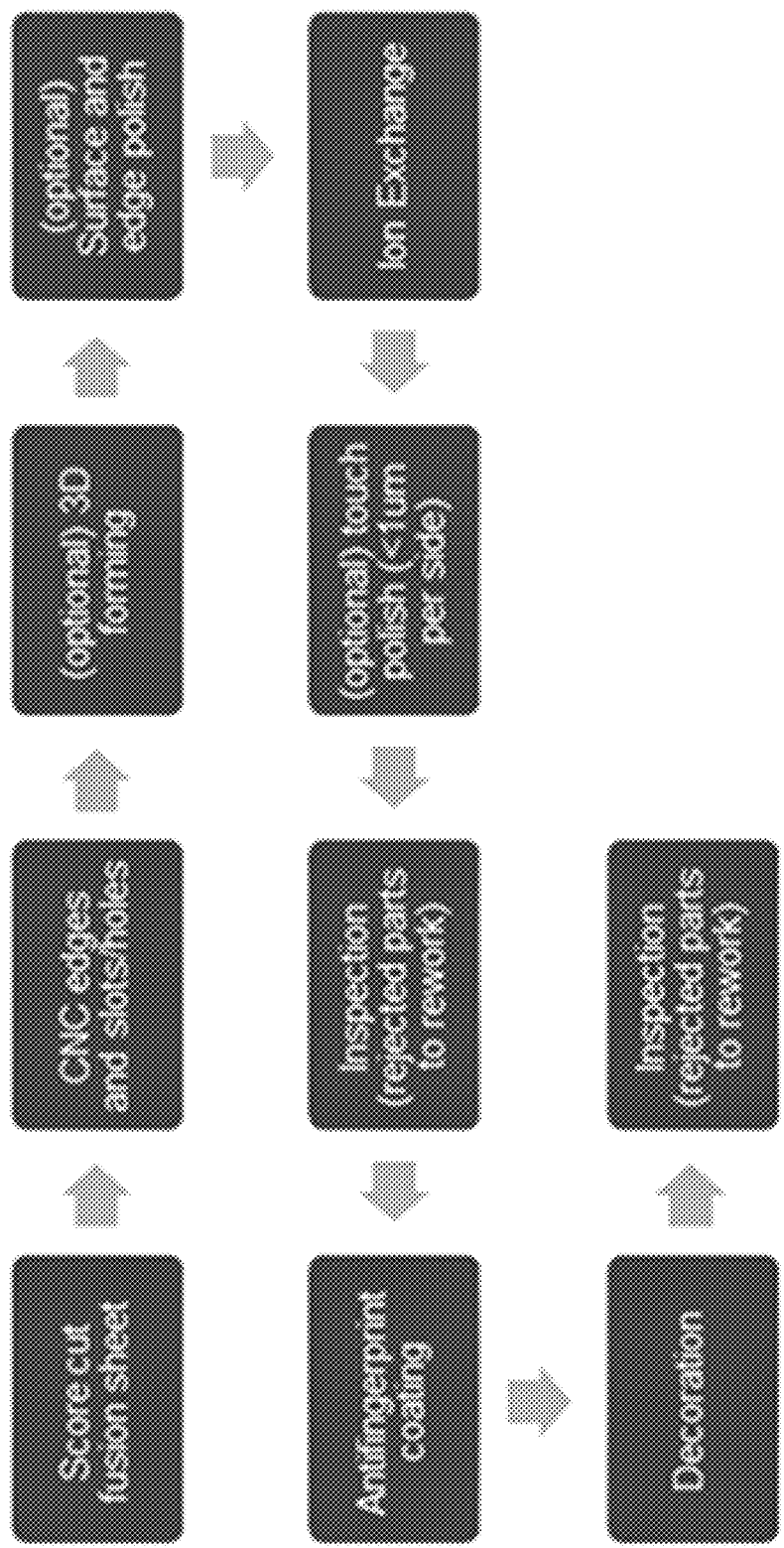
FIG. 2 is a flow chart of a production process of an ion exchanged glass-based article.

An exemplary process for manufacturing a chemically strengthened glass-based article and determining whether parts require rework is illustrated in FIG. 2. As shown in FIG. 2, the glass-based article manufacturing process may include score cutting a glass-based sheet formed by a fusion process, machining the edges and/or forming holes in the resulting parts, optionally 3-D forming the machined parts, and then optionally polishing the edges and surface of the parts. The parts are then chemically strengthened in an ion exchange process to form ion exchanged glass-based articles. The ion exchanged glass-based articles are then optionally polished to remove less than 1 µm of material from each side of the ion exchanged glass-based articles before inspecting the glass-based articles to determine if they meet manufacturing standards. The parts that do not meet the desired standards are then processed as rework to increase the yield of the manufacturing process. Parts may fail to meet manufacturing standards for a variety of reasons, such as including surface defects or having an undesired stress profile. Surface defects may be formed as a result of handling during various stages of the manufacturing process. After inspection the parts which were not designated for rework may have an anti-fingerprint coating and/or decoration applied. The parts are then inspected again to determine if they meet manufacturing standards, and the parts that fail to meet the manufacturing standards are processed as rework.

Figure 3:
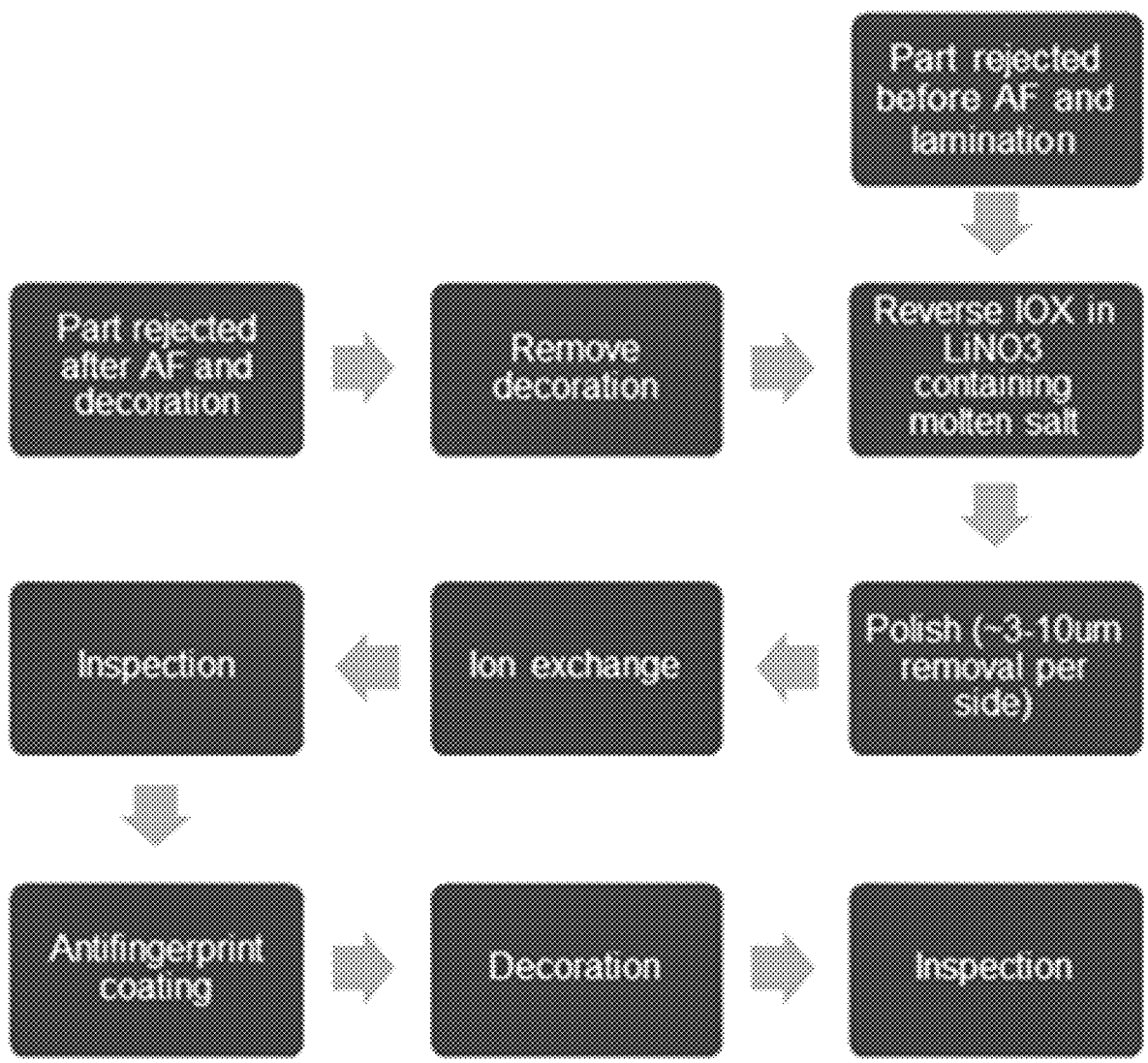
FIG. 3 is a flow chart of a rework process including a reverse ion exchange process.

FIG. 3 illustrates an exemplary rework processing method. In some embodiments, one or more of the steps shown in FIG. 3 are not performed. In some embodiments, additional steps not shown in FIG. 3 may be performed as part of the rework processing method. The rework processing method includes reverse ion exchanging the ion exchanged glass-based articles in a lithium salt containing reverse ion exchange bath to produce a reverse ion exchanged glass-based article. If the ion exchanged articles include a decoration, the decoration may be removed before the reverse ion exchange. In some embodiments, anti-fingerprint (AF) coatings do not need to be removed before the ion exchanged glass-based articles are subjected to reverse ion exchange. The reverse ion exchanged glass-based articles may be optionally subjected to mechanical polishing or chemical etching to remove material from the surface of the reverse ion exchanged glass-based articles. Removing material from the surface of the reverse ion exchanged glass-based articles may also remove surface defects. The reverse ion exchanged glass-based articles may then be re-ion exchanged in a re-ion exchange bath to form a re-ion exchanged glass-based article. The re-ion exchanged glass-based article is then inspected to determine whether the part falls within the desired manufacturing standards. An anti-fingerprint coating and/or a decoration may then be applied to the re-ion exchanged glass-based article before a final inspection to determine whether the part falls within the desired manufacturing standards.

The reverse ion exchange process removes ions from the ion exchanged glass-based article to return the glass-based article to approximately its pre-ion exchange state. The composition of the reverse ion exchange medium is selected to remove the ions added to the glass-based article during the ion exchange process. In some embodiments, for example, but not limited to, when the non-ion-exchanged glass-based article comprises $Li_2O$ and $Na_2O$, the reverse ion exchange medium may contain $LiNO_3$ and $NaNO_3$, with the relative amounts of $LiNO_3$ and $NaNO_3$ selected such that equilibrium weight gain of the non-ion exchanged glass-based article in the reverse ion exchange medium is near zero or positive. If the $LiNO_3$ content of the reverse ion exchange medium is too high, an excess of $LiO_2$ may accumulate in the surface of the reverse ion exchanged glass-based article, producing surface tension that may produce surface cracks in the glass-based articles.

In embodiments, the reverse ion exchange is conducted in a single step. The reverse ion exchange medium utilized in the single step reverse ion exchange may include a lithium salt and a non-ion exchangeable multivalent metal salt. The reverse ion exchange medium may be a molten salt bath, and will be referred to as a reverse ion exchange bath hereafter for the sake of simplicity. As utilized herein, a "non-ion exchangeable multivalent metal salt" refers to a multivalent metal salt that undergoes substantially no ion exchange at the operating conditions, time and temperature, of the ion exchange bath. Substantially no ion exchange is characterized by an exchange depth of less than 1 µm after the conclusion of the exposure to the bath. Stated differently, the concentration of the multivalent metal is the same as the concentration of the multivalent metal in the composition utilized to form the glass-based article prior to ion exchange at depths greater than 1 µm. The inclusion of the non-ion exchangeable multivalent metal salt in the reverse ion exchange bath allows for the reduction of the total amount of lithium salt in the bath, while maintaining the ratio of the lithium content to the other salts in the bath at the desired level. For example, If a desired ratio of $NaNO_3$ to $LiNO_3$ in the reverse ion exchange bath is 4:1, including 50 wt % of a non-ion exchangeable multivalent metal salt in the bath allows the total content of $NaNO_3$ and $LiNO_3$ to be reduced by half while maintaining the desired ratio.

The reduced amount of $NaNO_3$ and $LiNO_3$ in the bath reduces the cost of the reverse ion exchange process by reducing the required amount of lithium salts, which are relatively expensive. The reduced concentration of lithium salts in the reverse ion exchange bath also reduces the loss of lithium due to drag-out when the glass-based articles are removed from the reverse ion exchange bath, as the same amount of drag out removes a reduce amount of lithium salt from the bath. Drag-out refers to the molten salt that sticks to the glass-based article and fixtures holding the glass-based articles when they are removed from the molten salt bath. Additionally, the lower amount of $LiNO_3$ in the reverse ion exchange bath may reduce the emission of nitrogen oxide due to the decomposition of lithium nitrate at the reverse ion exchange bath temperature, providing increased safety.

In embodiments, the non-ion exchangeable multivalent metal salt included in the reverse ion exchange bath may be any multivalent metal salt that undergoes substantially no ion exchange and dissolves at the operating temperature of the bath. Exemplary non-ion exchangeable multivalent metal salts may be selected from nitrates, sulfates, and chlorides. The metal in the non-ion exchangeable multivalent metal salt may be selected from calcium, zinc, magnesium, tin, and copper. In embodiments, the non-ion exchangeable multivalent metal salt may include at least one of calcium nitrate, magnesium nitrate, and strontium nitrate.

The reverse ion exchange bath may include the non-ion exchangeable multivalent metal salt in any appropriate amount. In embodiments, the reverse ion exchange bath may include the non-ion exchangeable multivalent metal salt in an amount greater than or equal to 5 wt %, such as greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, or greater than or equal to 75 wt %. In embodiments, the reverse ion exchange bath may include the non-ion exchangeable multivalent metal salt in an amount less than or equal to 80 wt %, such as less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, or less than or equal to 10 wt %. In embodiments, the reverse ion exchange bath may include the non-ion exchangeable multivalent metal salt in a range from greater than or equal to 5 wt % to less than or equal to 80 wt %, such as greater than or equal to 10 wt % to less than or equal to 75 wt %, greater than or equal to 15 wt % to less than or equal to 70 wt %, greater than or equal to 20 wt % to less than or equal to 65 wt %, greater than or equal to 25 wt % to less than or equal to 60 wt %, greater than or equal to 30 wt % to less than or equal to 55 wt %, greater than or equal to 35 wt % to less than or equal to 50 wt %, or greater than or equal to 40 wt % to less than or equal to 45 wt %, and any and all sub-ranges formed from the foregoing endpoints.

In embodiments, the lithium salt in the reverse ion exchange bath may be lithium nitrate ($LiNO_3$). In embodiments, the reverse ion exchange bath may include any appropriate amount of lithium salt sufficient to produce the desired degree of reverse ion exchange. In embodiments, the reverse ion exchange bath may include $LiNO_3$ in a range from greater than or equal to 3 wt % to less than or equal to 40 wt %, such as greater than or equal to 3 wt % to less than or equal to 33 wt %, greater than or equal to 5 wt % to less than or equal to 30 wt %, greater than or equal to 10 wt % to less than or equal to 25 wt %, or greater than or equal to 15 wt % to less than or equal to 20 wt %, and any and all sub-ranges formed by the foregoing end points.

In embodiments, the reverse ion exchange bath may additionally include a sodium salt, such as sodium nitrate ($NaNO_3$). The reverse ion exchange bath may contain $NaNO_3$ in a range from greater than or equal to 30 wt % to less than or equal to 95 wt %, such as from greater than or equal to 35 wt % to less than or equal to 90 wt %, greater than or equal to 40 wt % to less than or equal to 85 wt %, greater than or equal to 45 wt % to less than or equal to 80 wt %, greater than or equal to 50 wt % to less than or equal to 75 wt %, greater than or equal to 55 wt % to less than or equal to 70 wt %, or greater than or equal to 60 wt % to less than or equal to 65 wt %, and any and all sub-ranges formed by the foregoing end points.

In some embodiments, the reverse ion exchange bath may contain potassium nitrate ($KNO_3$). The $KNO_3$ in the reverse ion exchange bath may be the result of the same reverse ion exchange bath being employed for multiple reverse ion exchange cycles, with and potassium removed from the glass-based article poisoning the reverse ion exchange bath. The reverse ion exchange bath may contain less than or equal to 5 wt % $KNO_3$, such as less than or equal to 1 wt % $KNO_3$. The reverse ion exchange bath may be substantially free or free of $KNO_3$.

The reverse ion exchange bath composition may be determined based on the composition of the glass-based article before ion exchange. The appropriate reverse ion exchange bath composition may be determined based on the desired $Li_2O$ and $Na_2O$ content in the glass-based article. For example, the amount of lithium salt may be selected such that a ratio of the lithium salt to the content of a sodium salt in the reverse ion exchange bath is substantially similar to the ratio of $Li_2O$ to $Na_2O$ in the glass-based composition before ion exchange. In embodiments, the ratio of the lithium salt to the sodium salt in the reverse ion exchange bath may be within 10% of the ratio of $Li_2O$ to $Na_2O$ in the glass-based composition before ion exchange, such as within 9%, within 8%, within 7%, within 6%, within 5%, within 4%, within 3%, within 2%, or within 1%. In some embodiments, the ratio of the lithium salt to the sodium salt in the reverse ion exchange bath is equivalent to the ratio of $Li_2O$ to $Na_2O$ in the glass-based composition before ion exchange. The composition at the center of the chemically strengthened glass-based article may be employed as an approximation of the composition of the glass-based article before ion exchange, as in many chemical strengthening processes the center of the glass-based article does not undergo significant ion exchange.

The single step reverse ion exchange process may include the reverse ion exchange of the ion exchanged glass-based article in the reverse ion exchange bath for any appropriate time period. In embodiments, the reverse ion exchange may extend for a time in the range from greater than or equal to 1 hour to less than or equal to 48 hours, such as greater than or equal to 2 hours to less than or equal to 24 hours, greater than or equal to 3 hours to less than or equal to 16 hours, greater than or equal to 4 hours to less than or equal to 14 hours, greater than or equal to 6 hours to less than or equal to 12 hours, or greater than or equal to 8 hours to less than or equal to 10 hours, and any and all sub-ranges formed from the foregoing end points.

The reverse ion exchange bath may at any appropriate temperature when the single step reverse ion exchange of the ion exchanged glass-based article is carried out. In embodiments, the reverse ion exchange bath is at a temperature in the range from greater than or equal to 340° C. to less than or equal to 520° C., such as greater than or equal to 360° C. to less than or equal to 500° C., greater than or equal to 380° C. to less than or equal to 480° C., greater than or equal to 400° C. to less than or equal to 460° C., or greater than or equal to 420° C. to less than or equal to 440° C., and any and all sub-ranges formed from the foregoing end points.

In embodiments, the reverse ion exchanged glass-based article produced by the single step reverse ion exchange process may have a $K_2O$ content within 1 mol % or less of the composition at the center of the reverse ion exchanged glass-based article. This $K_2O$ content indicates that the reverse ion exchanged glass-based article has been substantially restored to the composition of the glass-based article before the ion exchange treatment.

In embodiments, the reverse ion exchange is conducted in a two-step process. The two-step process includes reverse ion exchanging an ion exchanged glass-based article in a first reverse ion exchange medium, and then reverse ion exchanging the ion exchanged glass-based articles in a second reverse ion exchange medium to produce a reverse ion exchanged glass-based article.

The first reverse ion exchange medium contains a sodium salt. The first reverse ion exchange medium may be a molten salt bath, and will be referred to as a first reverse ion exchange bath hereafter for the sake of simplicity. In embodiments, the sodium salt may be sodium nitrate. In embodiments, the first reverse ion exchange bath additionally contains a non-ion exchangeable multivalent metal salt. The non-ion exchangeable multivalent metal salt may be any of those in any of the amounts described above with respect to the single-step reverse ion exchange process.

The first reverse ion exchange bath may additionally contain other ion exchange salts. In embodiments, the first reverse ion exchange bath may contain potassium, such as in the form of a potassium salt. The first reverse ion exchange bath may contain $KNO_3$ in an amount greater than or equal to 6 wt %, such as greater than or equal to 7 wt %, greater than or equal to 8 wt %, greater than or equal to 9 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, or greater than or equal to 45 wt %. The first reverse ion exchange bath may contain $KNO_3$ in an amount from greater than or equal to 6 wt % to less than or equal to 50 wt %, such as greater than or equal to 7 wt % to less than or equal to 45 wt %, greater than or equal to 8 wt % to less than or equal to 40 wt %, greater than or equal to 9 wt % to less than or equal to 35 wt %, greater than or equal to 10 wt % to less than or equal to 30 wt %, greater than or equal to 15 wt % to less than or equal to 25 wt %, or equal to 20 wt %, and any and all sub-ranges formed from the foregoing end points. The use of a first reverse ion exchange bath containing potassium allows continued use of baths that include higher amounts of potassium, such as contributed by poisoning during use, for the first reverse ion exchange. For example, baths that had been employed as the second reverse ion exchange bath but have reached potassium poisoning levels that are no longer suitable for achieving the desired degree of reverse ion exchange may be employed as the first reverse ion exchange bath. Such reuse of potassium poisoned baths reduces cost and waste in the reverse ion exchange process.

The first reverse ion exchange bath may additionally include a lithium salt. In embodiments, the first reverse ion exchange bath has a Na/Li ratio that is greater than the Na/Li ratio of the second reverse ion exchange bath.

The reverse ion exchange in the first reverse ion exchange bath may be carried out for any appropriate time period. In embodiments, the reverse ion exchange in the first reverse ion exchange bath may be carried out for a time in the range of greater than or equal to 5 minutes to less than or equal to 24 hours, such as greater than or equal to 10 minutes to less than or equal to 20 hours, greater than or equal to 30 minutes to less than or equal to 18 hours, greater than or equal to 1 hour to less than or equal to 16 hours, greater than or equal to 2 hours to less than or equal to 14 hours, greater than or equal to 4 hours to less than or equal to 12 hours, greater than or equal to 6 hours to less than or equal to 10 hours, or equal to 8 hours, and any and all sub-ranges formed from the foregoing end points. In embodiments, the reverse ion exchange in the first reverse ion exchange bath may be carried out for a time period extending for less than half of the total reverse ion exchange time in the first and second reverse ion exchange baths.

The reverse ion exchange in the first reverse ion exchange bath may be carried out at any appropriate temperature. In embodiments, the reverse ion exchange in the first reverse ion exchange bath may be carried out at a temperature in the range from greater than or equal to 400° C. to less than or equal to 420° C., such as greater than or equal to 405° C. to less than or equal to 415° C., or equal to 410° C., and any and all sub-ranges formed from the foregoing endpoints. In embodiments, the reverse ion exchange in the first reverse ion exchange bath may be carried out at a temperature that is greater than the temperature at which the reverse ion exchange in the second reverse ion exchange bath is carried out.

At the conclusion of the reverse ion exchange in the first reverse ion exchange bath, the ion exchanged glass-based article may include $K_2O$ in an amount within 4 mol % of the composition of the glass-based article before ion exchange, such as within 3 mol %, or within 2 mol %. The composition of the glass-based article may be approximated by the composition at the center of the ion exchanged glass-based article after the reverse ion exchange in the first reverse ion exchange bath. Additionally, at the conclusion of the reverse ion exchange in the first reverse ion exchange bath the potassium added to the glass-based article during the ion exchange may be reduced in an amount from greater than or equal to 60% to less than or equal to 80%. The removal of a substantial portion of the potassium from the ion exchanged glass-based article in the first ion exchange bath decreases the rate at which the second reverse ion exchange bath is poised by potassium, increasing the useful lifetime of the second reverse ion exchange bath.

The second reverse ion exchange bath contains a sodium salt and a lithium salt. The second reverse ion exchange medium may be a molten salt bath, and will be referred to as a second reverse ion exchange bath hereafter for the sake of simplicity. In embodiments, the sodium salt may be sodium nitrate. In embodiments, the lithium salt may be lithium nitrate. In embodiments, the second reverse ion exchange bath additionally contains a non-ion exchangeable multivalent metal salt. The non-ion exchangeable multivalent metal salt may be any of those in any of the amounts described above with respect to the single-step reverse ion exchange process.

The reverse ion exchange in the second reverse ion exchange bath may be carried out for any appropriate time period. In embodiments, the reverse ion exchange in the second reverse ion exchange bath may be carried out for a time period extending for greater than or equal to half of the total reverse ion exchange time in the first and second reverse ion exchange baths.

The reverse ion exchange in the second reverse ion exchange bath may be carried out at any appropriate temperature. In embodiments, the reverse ion exchange in the second reverse ion exchange bath may be carried out at a temperature in the range from greater than or equal to 380° C. to less than or equal to 400° C., such as greater than or equal to 385° C. to less than or equal to 395° C., or equal to 390° C., and any and all sub-ranges formed from the foregoing endpoints. In embodiments, the reverse ion exchange in the second reverse ion exchange bath may be carried out at a temperature that is less than the temperature at which the reverse ion exchange in the first reverse ion exchange bath is carried out. The lower temperature of the second reverse ion exchange bath may reduce the emission of nitrogen oxide due to the decomposition of lithium nitrate at the second reverse ion exchange bath temperature, providing increased safety.

In embodiments, the reverse ion exchanged glass-based article produced by the reverse ion exchange in the second reverse ion exchange bath may have a $K_2O$ content within 1 mol % or less of the composition at the center of the reverse ion exchanged glass-based article. This $K_2O$ content indicates that the reverse ion exchanged glass-based article has been substantially restored to the composition of the glass-based article before the ion exchange treatment.

The reverse ion exchanged glass-based articles produced by any of the reverse ion exchange processes described herein may subsequently be subjected to mechanical polishing or chemical etching to remove material from the surface of the glass-based article. This material removal serves to remove any surface defects from the reverse ion exchanged glass-based article. In embodiments, the amount of material removed from the reverse ion exchanged glass-based article may be in a range from greater than or equal to 1 μm to less than or equal to 10 μm, such as greater than or equal to 3 μm to less than or equal to 10 μm, or greater than or equal to 5 μm to less than or equal to 10 μm, and any and all sub-ranges formed from the foregoing endpoints. In embodiments, the material removal process may be a chemical etching process, such as an acid etching process. The acid etching process may be a hydrofluoric acid etching process.

The reverse ion exchanged glass-based articles produced by any of the reverse ion exchange processes described herein may subsequently be re-ion exchanged in a re-ion exchange medium to produce a re-ion exchanged glass-based article. The re-ion exchange medium may be a molten salt bath, and will be referred to as a re-ion exchange bath hereafter for the sake of simplicity. The re-ion exchange bath may be the same as the ion exchange bath employed to produce the ion exchanged glass-based article. Similarly, the re-ion exchanged glass-based article may be subjected to a second re-ion exchange process in a second re-ion exchange medium. The second re-ion exchange medium may be a molten salt bath, and will be referred to as a second re-ion exchange bath hereafter for the sake of simplicity. The second re-ion exchange bath may be the same as a second ion exchange bath employed to produce the ion exchanged glass-based article.

The first re-ion exchange bath may include any appropriate salt mixture. For example, the first re-ion exchange bath may include a mixture of $NaNO_3$ and $KNO_3$. In embodiments, the first re-ion exchange bath may include $NaNO_3$ in a range from greater than or equal to 15 wt % to less than or equal to 40 wt %, such as greater than or equal to 20 wt % to less than or equal to 35 wt %, or greater than or equal to 25 wt % to less than or equal to 30 wt %, and any and all sub-ranges formed from the foregoing endpoints. In embodiments, the first re-ion exchange bath may include $KNO_3$ in a range from greater than or equal to 60 wt % to less than or equal to 85 wt %, such as greater than or equal to 65 wt % to less than or equal to 80 wt %, or greater than or equal to 70 wt % to less than or equal to 75 wt %, and any and all sub-ranges formed from the foregoing endpoints.

The re-ion exchange in the first re-ion exchange bath may be carried out for any appropriate time period. In embodiments, the re-ion exchange in the first re-ion exchange bath is carried out for a time in a range from greater than or equal to 30 minutes to less than or equal to 120 minutes, such as greater than or equal to 40 minutes to less than or equal to 110 minutes, greater than or equal to 50 minutes to less than or equal to 100 minutes, greater than or equal to 60 minutes to less than or equal to 90 minutes, or greater than or equal to 70 minutes to less than or equal to 80 minutes, and any and all sub-ranges formed from the foregoing end points.

The re-ion exchange in the first re-ion exchange bath may be carried out at any appropriate temperature. In embodiments, the re-ion exchange in the first re-ion exchange bath is carried out at a temperature in the range from greater than or equal to 350° C. to less than or equal to 420° C., such as greater than or equal to 360° C. to less than or equal to 410° C., greater than or equal to 370° C. to less than or equal to 400° C., or greater than or equal to 380° C. to less than or equal to 390° C., and any and all sub-ranges formed from the foregoing end points.

The second re-ion exchange bath may include any appropriate salt mixture. For example, the second re-ion exchange bath may include a mixture of $NaNO_3$ and $KNO_3$. In embodiments, the second re-ion exchange bath may include $NaNO_3$ in a range from greater than or equal to 3 wt % to less than or equal to 15 wt %, such as greater than or equal to 4 wt % to less than or equal to 10 wt %, or greater than or equal to 5 wt % to less than or equal to 9 wt %, and any and all sub-ranges formed from the foregoing endpoints. In embodiments, the second re-ion exchange bath may include $KNO_3$ in a range from greater than or equal to 85 wt % to less than or equal to 97 wt %, such as greater than or equal to 90 wt % to less than or equal to 95 wt %, or greater than or equal to 91 wt % to less than or equal to 94 wt %, and any and all sub-ranges formed from the foregoing endpoints.

The re-ion exchange in the second re-ion exchange bath may be carried out for any appropriate time period. In embodiments, the re-ion exchange in the second re-ion exchange bath is carried out for a time in a range from greater than or equal to 10 minutes to less than or equal to 30 minutes, such as greater than or equal to 12 minutes to less than or equal to 28 minutes, greater than or equal to 14 minutes to less than or equal to 26 minutes, greater than or equal to 16 minutes to less than or equal to 24 minutes, greater than or equal to 18 minutes to less than or equal to 22 minutes, or equal to 20 minutes, and any and all sub-ranges formed from the foregoing end points.

The re-ion exchange in the second re-ion exchange bath may be carried out at any appropriate temperature. In embodiments, the re-ion exchange in the second re-ion exchange bath is carried out at a temperature in the range from greater than or equal to 350° C. to less than or equal to 420° C., such as greater than or equal to 360° C. to less than or equal to 410° C., greater than or equal to 370° C. to less than or equal to 400° C., or greater than or equal to 380° C. to less than or equal to 390° C., and any and all sub-ranges formed from the foregoing end points.

In one or more embodiments, the glass-based articles have a homogenous microstructure (i.e., the glass is not phase separated). In one or more embodiments, the glass-based article is amorphous. As used herein, "amorphous" when used to describe glass-based article means substantially free of crystallites or crystalline phases (i.e., containing less than 1 vol % crystallites or crystalline phases). In some embodiments, the glass-based articles may include a glass-ceramic (i.e., containing one or more crystalline phases).

The glass-based articles described herein may be formed from glass compositions that are fusion formable. In one or more embodiments, the fusion formable glass composition may have a liquidus viscosity greater than about 200 kilopoise (kP) and, in some embodiments, having a liquidus viscosity of at least about 600 kP. In some embodiments, these glass-based articles and compositions are compatible with a zircon isopipe: the viscosity at which the glass breaks down the zircon isopipe to create zirconia defects is less than 35 kP. Selected glass compositions within the composition ranges described herein may have a zircon breakdown viscosity that is greater than 35 kP. In such instances, an alumina isopipe may be used to fusion form these glass-based articles.

The glass-based articles described herein may be formed from any appropriate glass composition. In embodiments, the glass-based articles may be formed from an alkali aluminosilicate glass composition. In embodiments, the glass-based article comprises or consists essentially of greater than or equal to 58 mol % $SiO_2$, from greater than or equal to 0.5 mol % to less than or equal to 3 mol % $P_2O_5$, greater than or equal to 11 mol % $Al_2O_3$, $Na_2O$, and $Li_2O$. In embodiments, the glass-based article comprises or consists essentially of from greater than or equal to 58 mol % to less than or equal to 65 mol % $SiO_2$; from greater than or equal to 11 mol % to less than or equal to 20 mol % $Al_2O_3$; from greater than or equal to 0.5 mol % to less than or equal to 3 mol % $P_2O_5$; from greater than or equal to 6 mol % to less than or equal to 18 mol % $Na_2O$; from greater than or equal to 0.1 mol % to less than or equal to 10 mol % $Li_2O$; from greater than or equal to 0 mol % to less than or equal to 6 mol % MgO; and from greater than or equal to 0 mol % to less than or equal to 6 mol % ZnO. In embodiments, the glass comprises or consists essentially of from greater than or equal to 63 mol % to less than or equal to 65 mol % $SiO_2$; from greater than or equal to 11 mol % to less than or equal to 19 mol % $Al_2O_3$; from greater than or equal to 1 mol % to less than or equal to 3 mol % $P_2O_5$; from greater than or equal to 9 mol % to less than or equal to 20 mol % $Na_2O$; from greater than or equal to 2 mol % to less than or equal to 10 mol % $Li_2O$; from greater than or equal to 0 mol % to less than or equal to 6 mol % MgO; and from greater than or equal to 0 mol % to less than or equal to 6 mol % ZnO.

In one or more embodiments, the glass-based article may be formed from a composition that comprises the ratio $R_2O$ (mol %)/$Al_2O_3$ (mol %) that is less than or equal to 2, such as less than or equal to 1.8, less than or equal to 1.6, less than or equal to 1.5, or less than or equal to 1.4. As utilized herein, $R_2O=Li_2O+Na_2O+K_2O$. In one or more embodiments, the glass-based article comprises may be formed from a glass composition where the total amount of $SiO_2$ and $P_2O_5$ is greater than 65 mol % and less than 67 mol % (i.e., 65 mol %<$SiO_2$ (mol %)+$P_2O_5$ (mol %)<67 mol %). In one or more embodiments, the glass-based article may be formed from a composition where $R_2O$ (mol %)+WO (mol %) —$Al_2O_3$ (mol %)+$P_2O_5$ (mol %) that is greater than or equal to −3 mol % (i.e., $R_2O$ (mol %)+R'O (mol %) —$Al_2O_3$ (mol %)+$P_2O_5$ (mol %)>−3 mol %). As utilized herein, R'O is the total amount of divalent metal oxides present in the composition. In one or more embodiments, the glass-based articles may be formed from a composition where $R_2O$ (mol %)+WO (mol %) —$Al_2O_3$ (mol %)+$P_2O_5$ (mol %) that is greater than or equal to −2.5 mol %, such as greater than or equal to −2 mol %, greater than or equal to −1.5 mol %, greater than or equal to −1 mol %, greater than or equal to −0.5 mol %, greater than or equal to 0 mol %, greater than or equal to 0.5 mol %, greater than or equal to 1 mol %, greater than or equal to 1.5 mol %, greater than or equal to 2 mol %, greater than or equal to 2.5 mol %, greater than or equal to 3 mol %, greater than or equal to 3.5 mol %, greater than or equal to 4 mol %, greater than or equal to 4.5 mol %, greater than or equal to 5 mol %, greater than or equal to 5.5 mol %, greater than or equal to 6 mol %, greater than or equal to 6.5 mol %, greater than or equal to 7 mol %, greater than or equal to 7.5 mol %, greater than or equal to 8 mol %, greater than or equal to 8.5 mol %, greater than or equal to 9 mol %, or greater than or equal to 9.5 mol %.

In one or more embodiments, the glass-based articles may be formed from a composition that comprises at least 0.5 mol % $P_2O_5$, $Na_2O$ and $Li_2O$. In some embodiments, $Li_2O$ (mol %)/$Na_2O$ (mol %) in the glass composition utilized to form the glass-based articles may be less than 1. In addition, these glasses may be free of $B_2O_3$ and $K_2O$. The glass-based articles described herein may further include ZnO, MgO, and $SnO_2$.

Each of the oxide components of the base (or unstrengthened) and strengthened (i.e., chemically strengthened by ion exchange) alkali aluminosilicate glass-based articles described herein serves a function and/or has an effect on the manufacturability and physical properties of the glass. Silica ($SiO_2$), for example, is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. In one or more embodiments, the glass-based article may be formed from a composition that comprises $SiO_2$ in an amount in a range from greater than or equal to 58 mol % to less than or equal to 65 mol %, such as from greater than or equal to 59 mol % to less than or equal to 64 mol %, from greater than or equal to 60 mol % to less than or equal to 63 mol %, from greater than or equal to 61 mol % to less than or equal to 62 mol %, from greater than or equal to 63.2 mol % to less than or equal to 65 mol %, from greater than or equal to 63.3 mol % to less than or equal to 65 mol %, or any and all sub-ranges formed from the foregoing end points.

In addition to silica, the glass-based articles described herein may be formed from compositions that comprise the network former $Al_2O_3$ to achieve stable glass formation, low CTE, low Young's modulus, low shear modulus, and to facilitate melting and forming. Like $SiO_2$, $Al_2O_3$ contributes to the rigidity to the glass network. Alumina can exist in the glass in either fourfold or fivefold coordination, which increases the packing density of the glass network and thus increases the compressive stress resulting from chemical strengthening. In one or more embodiments, the glass-based article may be formed from a composition that comprises $Al_2O_3$ in an amount in a range from greater than or equal to 11 mol % to less than or equal to 20 mol %, such as from greater than or equal to 12 mol % to less than or equal to 19 mol %, from greater than or equal to 13 mol % to less than or equal to 18 mol %, from greater than or equal to 14 mol % to less than or equal to 17 mol %, or from greater than or equal to 15 mol % to less than or equal to 16 mol %, and any and all sub-ranges formed from the foregoing end points.

Phosphorous pentoxide ($P_2O_5$) is a network former that may be incorporated in the compositions utilized to form the glass-based articles described herein. $P_2O_5$ adopts a quasi-tetrahedral structure in the glass network; i.e., it is coordinated with four oxygen atoms, but only three of which are connected to the rest of the network. The fourth oxygen atom is a terminal oxygen that is doubly bound to the phosphorous cation. The incorporation of $P_2O_5$ in the glass network is highly effective at reducing Young's modulus and shear modulus. Incorporating $P_2O_5$ in the glass network also reduces the high temperature CTE, increases the ion-exchange interdiffusion rate, and improves glass compatibility with zircon refractory materials. In one or more embodiments, the glass-based article may be formed from a composition that comprises $P_2O_5$ in an amount in a range from greater than or equal to 0.5 mol % to less than or equal to 5 mol %, such as from greater than or equal to 0.6 mol % to less than or equal to 5 mol %, from greater than or equal to 0.8 mol % to less than or equal to 5 mol %, from greater than or equal to 1 mol % to less than or equal to 5 mol %, from greater than or equal to 1.2 mol % to less than or equal to 5 mol %, from greater than or equal to 1.4 mol % to less than or equal to 5 mol %, from greater than or equal to 1.5 mol % to less than or equal to 5 mol %, from greater than or equal to 1.6 mol % to less than or equal to 5 mol %, from greater than or equal to 1.8 mol % to less than or equal to 5 mol %, from greater than or equal to 2 mol % to less than or equal to 5 mol %, from greater than or equal to 0.5 mol % to less than or equal to 3 mol %, from greater than or equal to 0.5 mol % to less than or equal to 2.8 mol %, from greater than or equal to 0.5 mol % to less than or equal to 2.6 mol %, from greater than or equal to 0.5 mol % to less than or equal to 2.5 mol %, from greater than or equal to 0.5 mol % to less than or equal to 2.4 mol %, from greater than or equal to 0.5 mol % to less than or equal to 2.2 mol %, from greater than or equal to 0.5 mol % to less than or equal to 2 mol %, from greater than or equal to 2.5 mol % to less than or equal to 5 mol %, from greater than or equal to 2.5 mol % to less than or equal to 4 mol %, or from greater than or equal to 2.5 mol % to less than or equal to 3 mol %, and any and all sub-ranges formed from the foregoing end points.

The glass-based articles described herein may be formed from a composition that is substantially free or free of $B_2O_3$, as its presence has a negative impact on compressive stress when the glass is strengthened by ion exchange. In some embodiments, the glass-based articles may be formed from a composition including $B_2O_3$ in an amount from greater than or equal to 0.1 mol % to less than or equal to 10 mol %; such as greater than or equal to 0.5 mol % to less than or equal to 9 mol %, greater than or equal to 1 mol % to less than or equal to 8 mol %, greater than or equal to 2 mol % to less than or equal to 7 mol %, greater than or equal to 3 mol % to less than or equal to 6 mol %, or greater than or equal to 4 mol % to less than or equal to 5 mol %, and any and all sub-ranges formed from the foregoing end points.

The alkali oxide $Na_2O$ is used to achieve chemical strengthening of the glass-based articles described herein by ion exchange. The glass-based articles described herein may be formed from compositions including $Na_2O$, which provides the $Na^+$ cation to be exchanged for potassium cations present in a salt bath containing, for example, $KNO_3$. In some embodiments, the glass-based articles described herein may be formed from a composition including $Na_2O$ in a range from greater than or equal to 4 mol % to less than or equal to 20 mol %, such as from greater than or equal to 4.5 mol % to less than or equal to 19.5 mol %, from greater than or equal to 5 mol % to less than or equal to 19 mol %, from greater than or equal to 5.5 mol % to less than or equal to 18.5 mol %, from greater than or equal to 6 mol % to less than or equal to 18 mol %, from greater than or equal to 6.5 mol % to less than or equal to 17.5 mol %, from greater than or equal to 7 mol % to less than or equal to 17 mol %, from greater than or equal to 7.5 mol % to less than or equal to 16.5 mol %, from greater than or equal to 8 mol % to less than or equal to 16 mol %, from greater than or equal to 8.5 mol % to less than or equal to 15.5 mol %, from greater than or equal to 9 mol % to less than or equal to 15 mol %, from greater than or equal to 9.5 mol % to less than or equal to 14.5 mol %, from greater than or equal to 10 mol % to less than or equal to 14 mol %, from greater than or equal to 10.5 mol % to less than or equal to 13.5 mol %, from greater than or equal to 11 mol % to less than or equal to 13 mol %, or from greater than or equal to 11.5 mol % to less than or equal to 12.5 mol %, and any and all sub-ranges formed from the foregoing end points.

The glass-based articles described herein are formed from compositions that contain $Li_2O$. In some embodiments, the glass-based articles may be formed from compositions that include $Li_2O$ in an amount less than or equal to 13 mol %, such as less than or equal to 10 mol %. In some embodiments, the glass-based articles are formed from compositions that include $Li_2O$ in an amount in a range greater than or equal to 0.1 mol % to less than or equal to 10 mol %, such as from greater than or equal to 0.5 mol % to less than or equal to 9.5 mol %, from greater than or equal to 1 mol % to less than or equal to 9 mol %, from greater than or equal to 1.5 mol % to less than or equal to 8.5 mol %, from greater than or equal to 2 mol % to less than or equal to 8 mol %, from greater than or equal to 2.5 mol % to less than or equal to 7.5 mol %, from greater than or equal to 3 mol % to less than or equal to 7 mol %, from greater than or equal to 3.5 mol % to less than or equal to 6.5 mol %, from greater than or equal to 4 mol % to less than or equal to 6 mol %, from greater than or equal to 4.5 mol % to less than or equal to 5.5 mol %, or from greater than or equal to 4 mol % to less than or equal to 8 mol %, and any and all sub-ranges formed from the foregoing end points.

The presence of potassium oxide in the glass has a negative effect on the ability of to achieve high levels of surface compressive stress in the glass through ion exchange. The glass-based articles described herein, as originally formed before ion exchange, may be substantially free or free of $K_2O$. In embodiments, the glass-based articles may be formed from compositions that include $K_2O$.

In some embodiments, the glass-based articles described herein may be formed from compositions that include ZnO in an amount from greater than or equal to 0 mol % to less than or equal to 6 mol %, such as from greater than or equal to 0.5 mol % to less than or equal to 5.5 mol %, from greater than or equal to 1 mol % to less than or equal to 5 mol %, from greater than or equal to 1.5 mol % to less than or equal to 4.5 mol %, from greater than or equal to 2 mol % to less than or equal to 4 mol %, from greater than or equal to 2.5 mol % to less than or equal to 3.5 mol %, from greater than or equal to 0.1 mol % to less than or equal to 6 mol %, from greater than or equal to 0.1 mol % to less than or equal to 3 mol %, and any and all sub-ranges formed from the foregoing end points. The divalent oxide ZnO improves the melting behavior of the glass by reducing the temperature at a viscosity of 200 poise (200 P temperature).

Alkaline earth oxides such as MgO and CaO, may also be included in the composition utilized to form the glass-based articles to achieve a similar effect on the 200 P temperature. In embodiments, the glass-based articles described herein may be formed from compositions including MgO from greater than or equal to 0 mol % to less than or equal to 6 mol %, such as greater than or equal to 0.02 mol % to less than or equal to 6 mol %. Other alkaline earth oxides, such as SrO and BaO, may also be included in the compositions utilized to form the glass-based articles described herein.

In some embodiments, the glass-based articles described herein are formable by down-draw processes that are known in the art, such as slot-draw and fusion-draw processes.

The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for personal electronic devices, such as notebooks, entertainment devices, tables, laptops, mobile phones, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass composition must have a sufficiently high liquidus viscosity (i.e., the viscosity of a molten glass at the liquidus temperature). In some embodiments, compositions used to form the glass-based articles described herein have a liquidus viscosity of at least about 200 kilopoise (kP) and, in other embodiments, at least about 600 kP.

After the glass-based articles are formed, the article is chemically strengthened. Ion exchange is widely used to chemically strengthen glasses. In one particular example, alkali cations within a source of such cations (e.g., a molten salt bath) are exchanged with smaller alkali cations within the glass-based artilce to achieve a layer that is under a compressive stress near the surface of the glass-based article. The compressive layer extends from the surface to a depth of compression (DOC) within the glass-based article. In the glass-based articles described herein, for example, potassium ions from the cation source are exchanged for sodium and lithium ions within the glass-based article during ion exchange by immersing the glass-based article in a molten salt bath comprising a potassium salt such as, but not limited to, potassium nitrate ($KNO_3$). Other potassium salts that may be used in the ion exchange process include, but are not limited to, potassium chloride (KCl), potassium sulfate ($K_2SO_4$), and combinations thereof. The ion exchange baths described herein may contain alkali ions other than potassium and the corresponding salts. For example, the ion exchange bath may also include sodium salts such as sodium nitrate ($NaNO_3$), sodium sulfate, sodium chloride, and combinations thereof. In one or more embodiments, a mixture of two different salts may be utilized. For example, the glass-based articles may be immersed in a salt bath of $KNO_3$ and $NaNO_3$. In some embodiments, more than one bath may be used with the glass being immersed in one bath followed by another, successively. The baths may have the same or different compositions, temperatures, and/or immersion times.

In embodiments, the glass-based article is strengthened in a two-step ion exchange process that utilizes a first ion exchange bath and a second ion exchange bath. The first ion exchange bath may include any appropriate salt mixture. For example, the first ion exchange bath may include a mixture of $NaNO_3$ and $KNO_3$. In embodiments, the first ion exchange bath may include $NaNO_3$ in a range from greater than or equal to 15 wt % to less than or equal to 40 wt %, such as greater than or equal to 20 wt % to less than or equal to 35 wt %, or greater than or equal to 25 wt % to less than or equal to 30 wt %, and any and all sub-ranges formed from the foregoing endpoints. In embodiments, the first ion exchange bath may include $KNO_3$ in a range from greater than or equal to 60 wt % to less than or equal to 85 wt %, such as greater than or equal to 65 wt % to less than or equal to 80 wt %, or greater than or equal to 70 wt % to less than or equal to 75 wt %, and any and all sub-ranges formed from the foregoing endpoints.

The ion exchange in the first ion exchange bath may be carried out for any appropriate time period. In embodiments, the ion exchange in the first ion exchange bath is carried out for a time in a range from greater than or equal to 30 minutes to less than or equal to 120 minutes, such as greater than or equal to 40 minutes to less than or equal to 110 minutes, greater than or equal to 50 minutes to less than or equal to 100 minutes, greater than or equal to 60 minutes to less than or equal to 90 minutes, or greater than or equal to 70 minutes to less than or equal to 80 minutes, and any and all sub-ranges formed from the foregoing end points.

The ion exchange in the first ion exchange bath may be carried out at any appropriate temperature. In embodiments, the ion exchange in the first ion exchange bath is carried out at a temperature in the range from greater than or equal to 350° C. to less than or equal to 420° C., such as greater than or equal to 360° C. to less than or equal to 410° C., greater than or equal to 370° C. to less than or equal to 400° C., or greater than or equal to 380° C. to less than or equal to 390° C., and any and all sub-ranges formed from the foregoing end points.

The second ion exchange bath may include any appropriate salt mixture. For example, the second ion exchange bath may include a mixture of $NaNO_3$ and $KNO_3$. In embodiments, the second ion exchange bath may include $NaNO_3$ in a range from greater than or equal to 3 wt % to less than or equal to 15 wt %, such as greater than or equal to 4 wt % to less than or equal to 10 wt %, or greater than or equal to 5 wt % to less than or equal to 9 wt %, and any and all sub-ranges formed from the foregoing endpoints. In embodiments, the second ion exchange bath may include $KNO_3$ in a range from greater than or equal to 85 wt % to less than or equal to 97 wt %, such as greater than or equal to 90 wt % to less than or equal to 95 wt %, or greater than or equal to 91 wt % to less than or equal to 94 wt %, and any and all sub-ranges formed from the foregoing endpoints.

The ion exchange in the second ion exchange bath may be carried out for any appropriate time period. In embodiments, the ion exchange in the second ion exchange bath is carried out for a time in a range from greater than or equal to 10 minutes to less than or equal to 30 minutes, such as greater than or equal to 12 minutes to less than or equal to 28 minutes, greater than or equal to 14 minutes to less than or equal to 26 minutes, greater than or equal to 16 minutes to less than or equal to 24 minutes, greater than or equal to 18 minutes to less than or equal to 22 minutes, or equal to 20 minutes, and any and all sub-ranges formed from the foregoing end points.

The ion exchange in the second ion exchange bath may be carried out at any appropriate temperature. In embodiments, the ion exchange in the second ion exchange bath is carried out at a temperature in the range from greater than or equal to 350° C. to less than or equal to 420° C., such as greater than or equal to 360° C. to less than or equal to 410° C., greater than or equal to 370° C. to less than or equal to 400° C., or greater than or equal to 380° C. to less than or equal to 390° C., and any and all sub-ranges formed from the foregoing end points.

While the embodiment shown in FIG. 1 depicts a strengthened glass-based article 100 as a flat planar sheet or plate, the glass-based article may have other configurations, such as three-dimensional shapes or non-planar configurations. The strengthened glass-based article 100 has a first surface 110 and a second surface 112 defining a thickness t. In one or more embodiments, (such as the embodiment shown in FIG. 1) the strengthened glass-based article is a sheet including first surface 110 and opposing second surface 112 defining thickness t. The strengthened glass-based article 100 has a first compressive layer 120 extending from first surface 110 to a depth of layer $d_1$ into the bulk of the glass-based article 100. In the embodiment shown in FIG. 1, the strengthened glass-based article 100 also has a second compressive layer 122 extending from second surface 112 to a second depth of layer $d_2$. The glass-based article also has a central region 330 that extends from $d_1$ to $d_2$. Central region 130 is under a tensile stress or central tension (CT), which balances or counteracts the compressive stresses of layers 120 and 122. The depth $d_1$, $d_2$ of first and second compressive layers 120, 122 protects the strengthened glass-based article 100 from the propagation of flaws introduced by sharp impact to first and second surfaces 110, 112 of the strengthened glass-based article 100, while the compressive stress minimizes the likelihood of a flaw penetrating through the depth $d_1$, $d_2$ of first and second compressive layers 120, 122. DOC d1 and DOC d2 may be equal to one another or different from one another. In some embodiments, at least a portion of the central region (e.g., the portion extending from the DOC to a depth equal to 0.5 times the thickness of the article) may be free of $K_2O$ (as defined herein).

The DOC may be described as a fraction of the thickness t of the glass-based article. For example, in one or more embodiments, the DOC may be greater than or equal to 0.1 t, such as greater than or equal to 0.11 t, greater than or equal to 0.12 t, greater than or equal to 0.13 t, greater than or equal to 0.14 t, greater than or equal to 0.15 t, greater than or equal to 0.16 t, greater than or equal to 0.17 t, greater than or equal to 0.18 t, greater than or equal to 0.19 t, greater than or equal to 0.2 t, or greater than or equal to 0.21 t. In some embodiments, the DOC may be in a range from greater than or equal to 0.08 t to less than or equal to 0.25 t, such as from greater than or equal to 0.09 t to less than or equal to 0.24 t, from greater than or equal to 0.10 t to less than or equal to 0.23 t, from greater than or equal to 0.11 t to less than or equal to 0.22 t, from greater than or equal to 0.12 t to less than or equal to 0.21 t, from greater than or equal to 0.13 t to less than or equal to 0.20 t, from greater than or equal to 0.14 t to less than or equal to 0.19 t, from greater than or equal to 0.15 t to less than or equal to 0.18 t, from greater than or equal to 0.16 t to less than or equal to 0.19 t, and any and all sub-ranges formed from the foregoing end points. In some embodiments, the DOC may be less than or equal to 20 µm. In one or more embodiments, the DOC may be greater than or equal to 40 µm, such as from greater than or equal to 40 µm to less than or equal to 300 µm, from greater than or equal to 50 µm to less than or equal to 280 µm, from greater than or equal to 60 µm to less than or equal to 260 µm, from greater than or equal to 70 µm to less than or equal to 240 µm, from greater than or equal to 80 µm to less than or equal to 220 µm, from greater than or equal to 90 µm to less than or equal to 200 µm, from greater than or equal to 100 µm to less than or equal to 190 µm, from greater than or equal to 110 µm to less than or equal to 180 µm, from greater than or equal to 120 µm to less than or equal to 170 µm, from greater than or equal to 140 µm to less than or equal to 160 µm, or from greater than or equal to 150 µm to less than or equal to 300 µm, and any and all sub-ranges formed from the foregoing end points.

In one or more embodiments, the strengthened glass-based article may have a maximum compressive stress (which may be found at the surface or a depth within the glass-based article) of greater than or equal to 400 MPa, such as greater than or equal to 500 MPa, greater than or equal to 600 MPa, greater than or equal to 700 MPa, greater than or equal to 800 MPa, greater than or equal to 900 MPa, greater than or equal to 930 MPa, greater than or equal to 1000 MPa, or greater than or equal to 1050 MPa.

In one or more embodiments, the strengthened glass-based article may have a maximum tensile stress or central tension (CT) of greater than or equal to 40 MPa, such as greater than or equal to 45 MPa, greater than or equal to 50 MPa, greater than or equal to 60 MPa, greater than or equal to 70 MPa, greater than or equal to 75 MPa, greater than or equal to 80 MPa or greater, or greater than or equal to 85 MPa. In some embodiments, the maximum tensile stress or central tension (CT) may be in a range from greater than or equal to 40 MPa to less than or equal to 100 MPa.

In some embodiments, the ion exchanged glass-based articles may include large ions, such as silver, copper, cesium, or rubidium. The content of these large ions in the ion exchanged glass-based article may be up to about 5 mol %, such as up to about 3 mol %. In some embodiments, the re-ion exchange bath may include salts of the large ions, such that the large ions are re-ion exchanged into the reverse ion exchanged glass-based article as part of the rework process.

Figure 4:
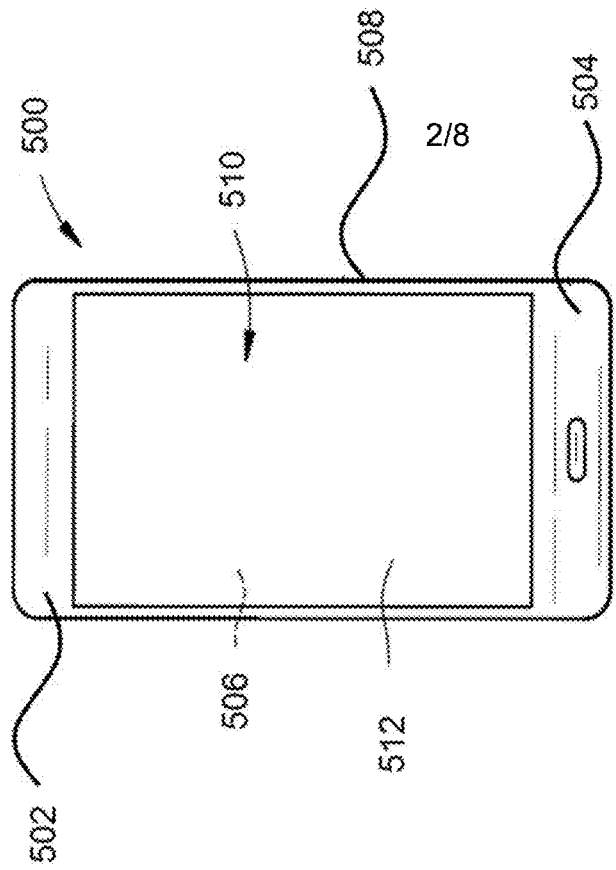
FIG. 4 is schematic, front plan view of a consumer electronic product including one or more embodiments of the alkali aluminosilicate glass-based articles described herein.
Figure 5:
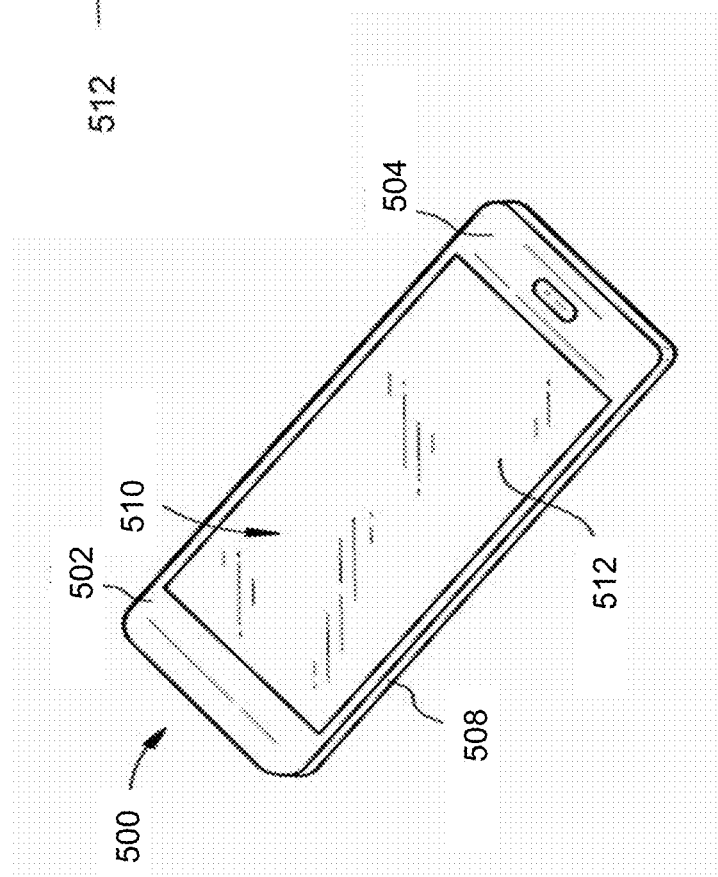
FIG. 5 is a schematic, prospective view of the consumer electronic product of FIG. 4.

In some embodiments, the glass-based articles described herein form a portion of a consumer electronic product, such as a cellular phone or smart phone, laptop computers, tablets, or the like. A schematic view of a consumer electronic product (e.g., a smart phone) is shown in FIGS. 4 and 5. A consumer electronic device 500 including a housing 502 having front 504, back 506, and side surfaces 508; electrical components (not shown) that are at least partially inside or entirely within the housing and including at least a controller, a memory, and a display 510 at or adjacent to the front surface of the housing; and a cover substrate 512 at or over the front surface of the housing such that it is over the display. In some embodiments, the cover substrate 512 and or housing may include any of the strengthened glass-based articles disclosed herein.

Exemplary Embodiments

The following non-limiting exemplary embodiments were produced.

Glass-based substrates were prepared with the following composition, on an oxide basis: 63.60 mol % $SiO_2$, 15.67 mol % $Al_2O_3$, 10.81 mol % $Na_2O$, 6.24 mol % $Li_2O$, 1.16 mol % ZnO, 2.48 mol % $P_2O_5$, and 0.04 mol % $SnO_2$. The glass-based substrates had a thickness of 0.7 mm, a width of 44 mm, and a length of 60 mm. The glass-based substrates were chemically strengthened in a two-step ion exchange process to form ion exchanged glass-based articles.

In the first ion exchange step the glass-based substrates were submerged in a molten salt bath at a temperature of 380° C. for 3 hours and 10 minutes. The first ion exchange bath included 75 wt % $NaNO_3$ and 25 wt % $KNO_3$.

In the second ion exchange step the glass-based substrates were submerged in a molten salt bath at a temperature of 380° C. for 25 minutes. The first second ion exchange bath included 9 wt % $NaNO_3$ and 91 wt % $KNO_3$.

The ion exchanged glass-based articles were then subjected to a reverse ion exchange process. The ion exchanged glass-based articles were reverse ion exchanged in a molten salt bath at a temperature of 420° C. for 2 hours, 4 hours, and 8 hours. The reverse ion exchange bath included 41.5 wt % $NaNO_3$, 8.5 wt % $LiNO_3$, and 50 wt % $Ca(NO_3)_2$. The examples may also be referred to as "rework with $Ca(NO_3)_2$" examples.

As comparative examples, ion exchanged glass-based articles were reverse ion exchanged in a molten salt bath at a temperature of 420° C. for 2 hours, 4 hours, and 8 hours. The control reverse ion exchange bath included 83 wt % $NaNO_3$ and 17 wt % $LiNO_3$. The comparative examples may also be referred to as "standard rework" examples.

The average weight gain, alkali concentration at a depth of 30 μm below the surface, and depth at which the potassium concentration reached the concentration of the glass-based substrate prior to being ion exchanged of the samples was measured after each ion exchange step. The depth profiles of the alkali components were measured using a glow discharge optical emission spectroscopy (GDOES) method, as described herein. The measured values are reported in Table 1 below.

Figure 6:
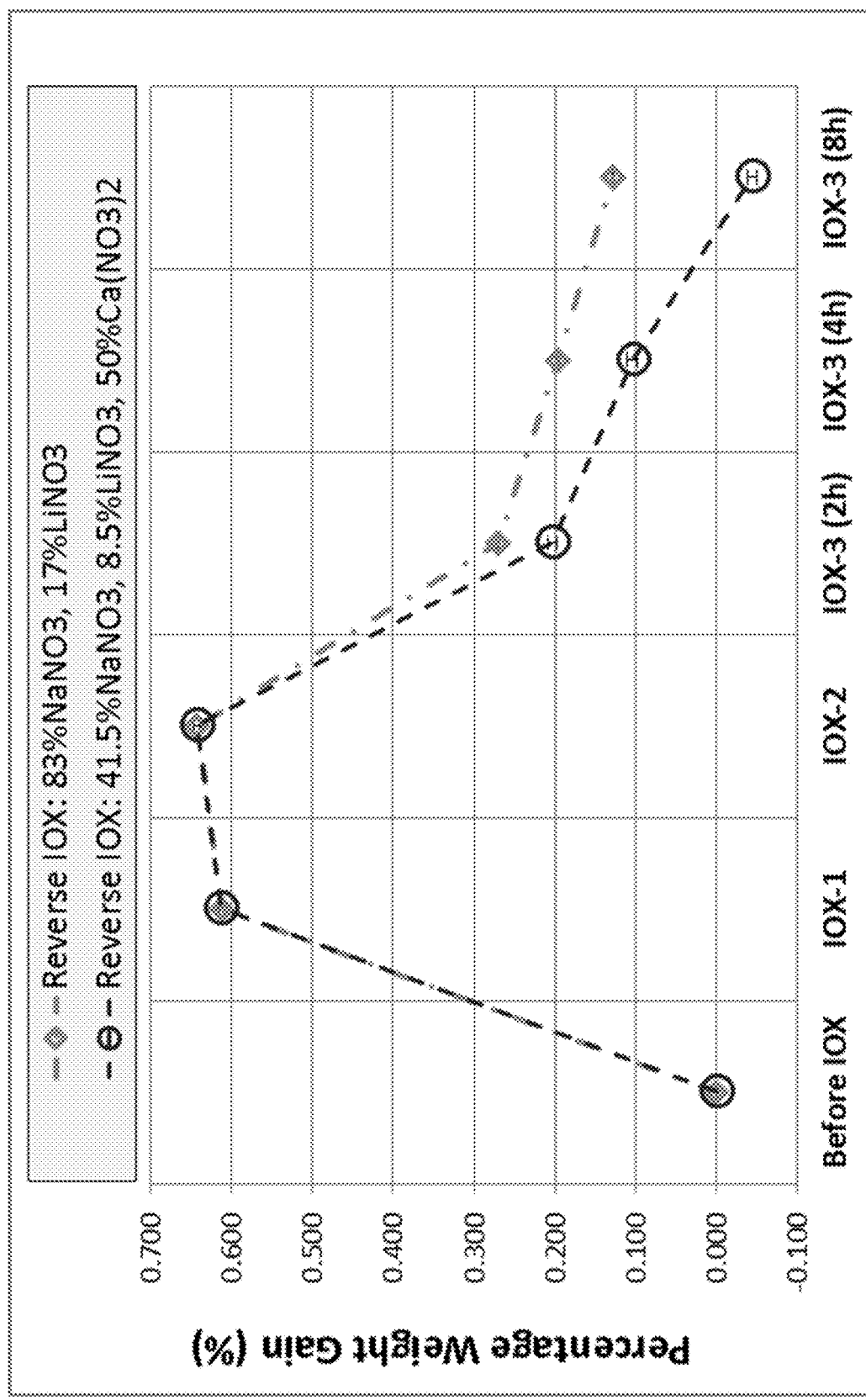
FIG. 6 is a plot of the percentage weight gain as a function of ion exchange treatments according to embodiments and comparative examples.
Figure 7:
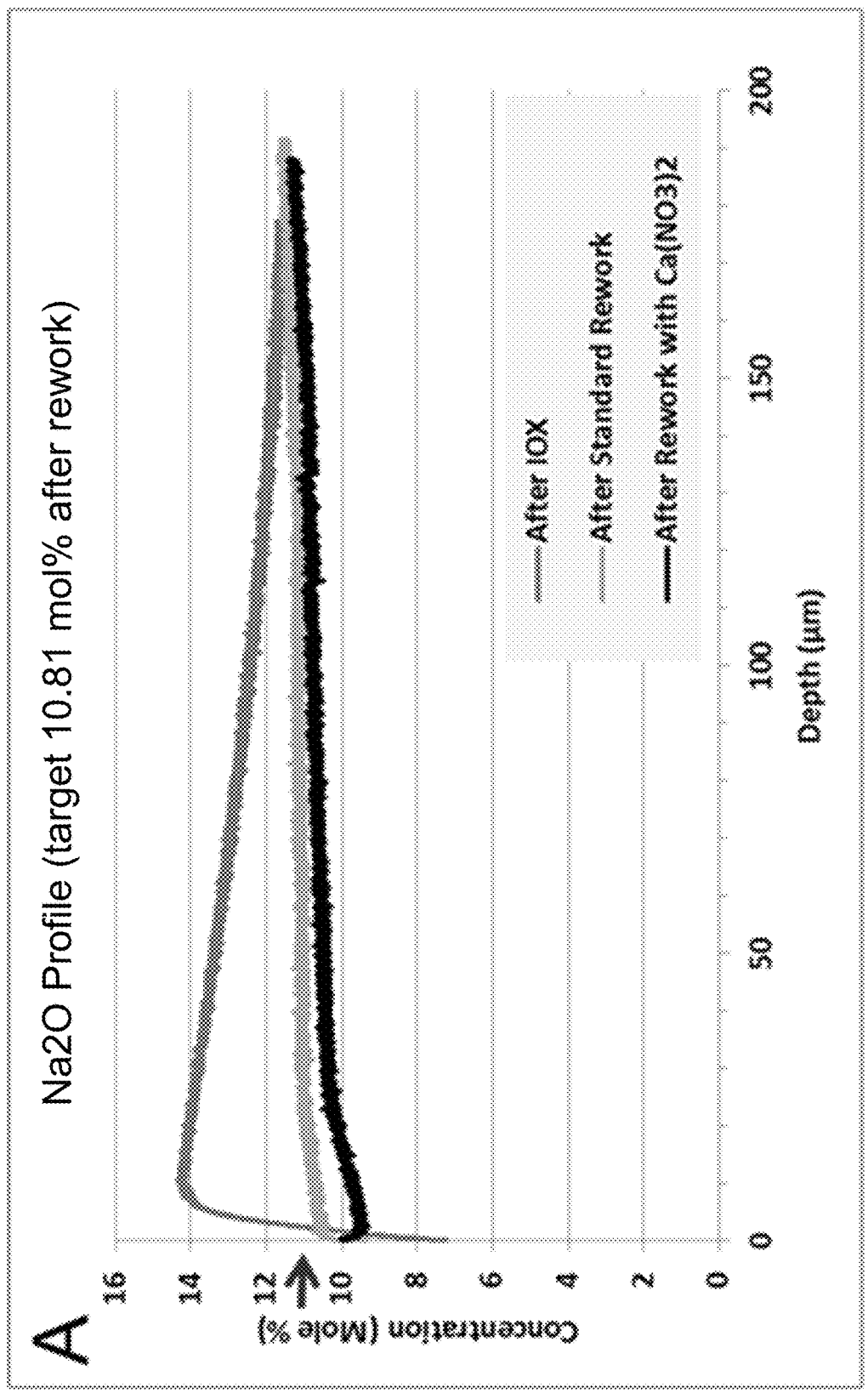
FIG. 7 is a plot of the $Na_2O$ concentration as a function of depth after ion exchange, after a standard rework process, and after a rework process with $Ca(NO_3)_2$ according to an embodiment.
Figure 8:
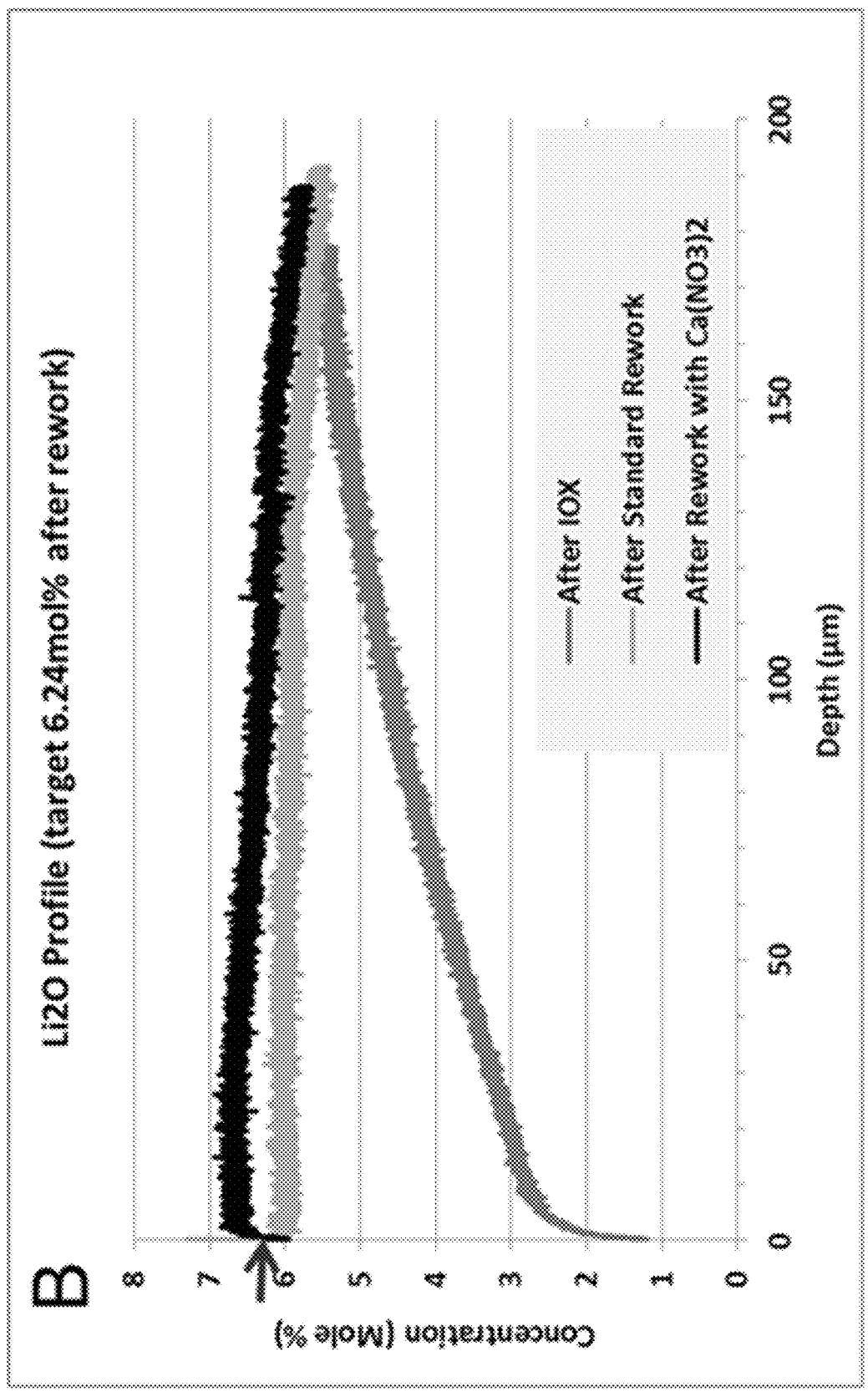
FIG. 8 is a plot of the $Li_2O$ concentration as a function of depth after ion exchange, after a standard rework process, and after a rework process with $Ca(NO_3)_2$ according to an embodiment.
Figure 9:
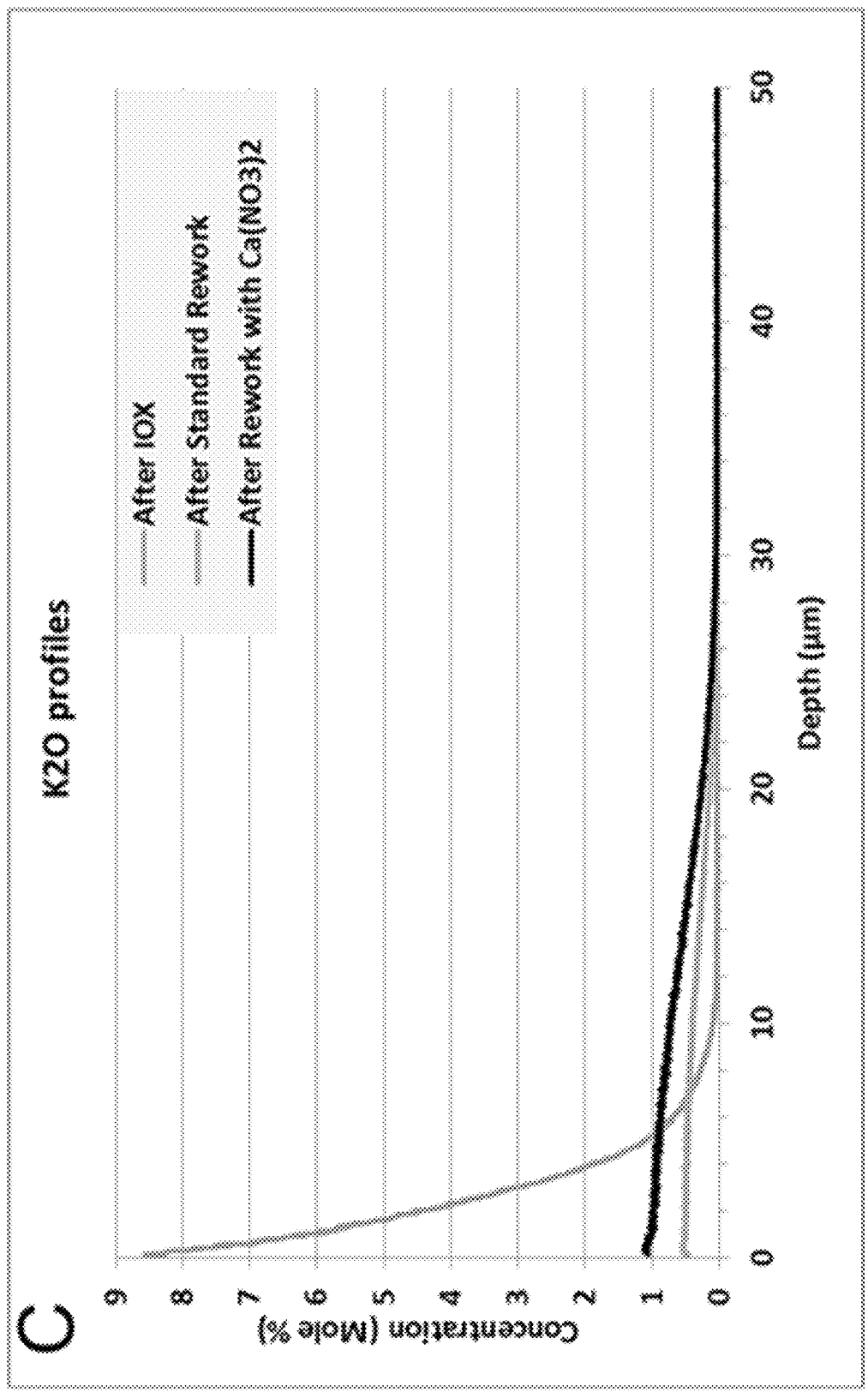
FIG. 9 is a plot of the $K_2O$ concentration as a function of depth after ion exchange, after a standard rework process, and after a rework process with $Ca(NO_3)_2$ according to an embodiment.

The measured weight gain percentage as a function of the ion exchange treatments is shown in FIG. 6. The measured $Na_2O$ concentration profiles as a function of depth from the surface is shown in FIG. 7. The measured $Li_2O$ concentration profiles as a function of depth from the surface are shown in FIG. 8. The measured $K_2O$ concentration profiles as a function of depth from the surface are shown in FIG. 9. As demonstrated by FIGS. 6-9 and Table 1, the rework with $Ca(NO_3)_2$ examples and standard rework examples exhibit similar properties, indicating the reverse ion exchange processes described herein provide satisfactory reverse ion exchange capabilities.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method, comprising:
reverse ion exchanging an ion exchanged glass-based article in a reverse ion exchange medium to produce a reverse ion exchanged glass-based article,
wherein the reverse ion exchange medium is a molten salt bath, the reverse ion exchange medium comprises a lithium salt and a non-ion exchangeable multivalent metal salt, and the reverse ion exchange medium comprises the non-ion exchangeable multivalent metal salt in an amount of greater than or equal to 45 wt % to less than or equal to 80 wt %.

2. The method of claim 1, wherein the lithium salt is lithium nitrate.

3. The method of claim 1, wherein the non-ion exchangeable multivalent metal salt comprises at least one of a nitrate, sulfate, and a chloride.

4. The method of claim 1, wherein the non-ion exchangeable multivalent metal salt comprises at least one of calcium nitrate, magnesium nitrate, and strontium nitrate.

5. The method of claim 1, wherein the reverse ion exchange medium comprises the non-ion exchangeable multivalent metal salt in an amount of greater than or equal to 45 wt % to less than or equal to 60 wt %.

6. The method of claim 1, wherein the reverse ion exchange medium further comprises a sodium salt.

TABLE 1

| | Examples | | | | | | Comparative Examples | | | | | |
|---|---|---|---|---|---|---|---|---|---|---|---|---|
| | Average Weight Gain (%) | Weight Gain Standard Deviation (%) | $K_2O$ at 30 μm (mol %) | $Na_2O$ at 30 μm (mol %) | $Li_2O$ at 30 μm (mol %) | $K_2O$ depth (μm) | Average Weight Gain (%) | Weight Gain Standard Deviation (%) | $K_2O$ at 30 μm (mol %) | $Na_2O$ at 30 μm (mol %) | $Li_2O$ at 30 μm (mol %) | $K_2O$ depth (μm) |
| Pre-IOX | 0 | 0 | 0 | 10.81 | 6.24 | 0 | 0 | 0 | 0 | 10.81 | 6.24 | 0 |
| 1st IOX | 0.612 | 0.003 | | | | | 0.613 | 0.006 | | | | |
| 2nd IOX | 0.643 | 0.005 | 0.03 | 13.79 | 3.28 | 10.4 | 0.643 | 0.004 | 0.03 | 13.79 | 3.28 | 10.4 |
| Reverse IOX 2 hrs | 0.27 | 0.001 | 0.03 | 11.11 | 5.95 | 16.7 | 0.204 | 0.006 | 0.03 | 10.74 | 6.32 | 18 |
| Reverse IOX 4 hrs | 0.197 | 0.002 | 0.03 | 11.16 | 5.9 | 20.5 | 0.104 | 0.006 | 0.03 | 10.83 | 6.23 | 22.4 |
| Reverse IOX 8 hrs | 0.128 | 0.001 | 0.04 | 11.06 | 5.99 | 24.7 | −0.044 | 0.006 | 0.05 | 10.37 | 6.68 | 27.3 |

7. The method of claim 6, wherein a ratio of the lithium salt to the sodium salt in the reverse ion exchange medium is within 10% of a ratio of the lithium oxide to sodium oxide content at the center of the ion exchanged glass-based article.

8. The method of claim 1, wherein the reverse ion exchange medium is at a temperature of greater than or equal to 340° C. to less than or equal to 520° C.

9. The method of claim 1, wherein the reverse ion exchange medium comprises less than or equal to 1 wt % potassium nitrate.

10. The method of claim 1, wherein the reverse ion exchange in the reverse ion exchange medium extends for a period of greater than or equal to 1 hours to less than or equal to 48 hours.

11. The method of claim 1, further comprising re-ion exchanging the reverse ion exchanged glass-based article in a re-ion exchange medium to form a re-ion exchanged glass-based article.

12. The method of claim 1, further comprising ion exchanging a glass-based article in an ion exchange medium to form the ion exchanged glass-based article.

13. The method of claim 1, wherein the reverse ion exchange medium comprises the non-ion exchangeable multivalent metal salt in an amount of greater than or equal to 50 wt % and less than or equal to 80 wt %.

14. The method of claim 13, wherein the reverse ion exchange medium comprises the non-ion exchangeable multivalent metal salt in an amount of greater than or equal to 50 wt % to less than or equal to 60 wt %.

15. The method of claim 1, wherein the reverse ion exchange medium comprises $NaNO_3$, $LiNO_3$, and $Ca(NO_3)_2$.

* * * * *